(12) United States Patent
Kurahashi

(10) Patent No.: US 8,024,376 B2
(45) Date of Patent: Sep. 20, 2011

(54) INFORMATION PROCESSING APPARATUS, INFORMATION PROCESSING METHOD, AND INFORMATION PROCESSING PROGRAM

(75) Inventor: Makoto Kurahashi, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 437 days.

(21) Appl. No.: 12/281,493

(22) PCT Filed: Mar. 7, 2007

(86) PCT No.: PCT/JP2007/054433
§ 371 (c)(1),
(2), (4) Date: Sep. 3, 2008

(87) PCT Pub. No.: WO2007/105560
PCT Pub. Date: Sep. 20, 2007

(65) Prior Publication Data
US 2009/0043821 A1 Feb. 12, 2009

(30) Foreign Application Priority Data

Mar. 10, 2006 (JP) ................. 2006-066659

(51) Int. Cl.
G06F 12/00 (2006.01)
G06F 17/00 (2006.01)
H04N 5/77 (2006.01)
H04N 9/80 (2006.01)
G06F 3/00 (2006.01)

(52) U.S. Cl. ........ 707/805; 386/224; 386/342; 386/243; 386/362; 715/719; 715/721

(58) Field of Classification Search .......... 386/241, 386/242, 224, 243, 362; 707/805; 715/700, 715/719, 721, 723
See application file for complete search history.

(56) References Cited

U.S. PATENT DOCUMENTS

| 5,930,446 A * | 7/1999 | Kanda ................ 386/241 |
| 6,195,497 B1 * | 2/2001 | Nagasaka et al. ........ 386/230 |
| 6,411,771 B1 * | 6/2002 | Aotake ................ 386/282 |
| 6,571,054 B1 * | 5/2003 | Tonomura et al. ........ 386/241 |
| 6,748,158 B1 * | 6/2004 | Jasinschi et al. ........ 386/242 |

FOREIGN PATENT DOCUMENTS

| JP | 7-98734 | 4/1995 |
| JP | 11-224266 | 8/1999 |
| JP | 2002-176613 | 6/2002 |
| JP | 2002-359804 | 12/2002 |
| JP | 2004-187043 | 7/2004 |
| JP | 2006-33567 | 2/2006 |
| JP | 2006-244074 | 9/2006 |

* cited by examiner

*Primary Examiner* — Vincent Boccio
(74) *Attorney, Agent, or Firm* — Drinker Biddle & Reath LLP

(57) ABSTRACT

An information processing apparatus is provided, the apparatus being capable of automating an editing work or the like of captured moving image without providing a specific arrangement, for example, to a moving-image capturing apparatus. An information processing apparatus, comprises: a recording unit 102 for storing in advance attribute information indicative of specific attribute set in advance as attribute which image information inputted from the outside and having a change of specific mode set in advance should include, an image analysis unit 106 for analyzing a change of the image information inputted, and an evaluation unit 107 for, based on the analyzed change and the stored attribute information, in a case where the analyzed change is a change of the specific mode, linking the attribute information indicative of the specific attribute corresponding to a change of the specific mode, to the image information having a change of the specific mode.

8 Claims, 7 Drawing Sheets

INFORMATION PROCESSING APPARATUS, INFORMATION PROCESSING METHOD, AND INFORMATION PROCESSING PROGRAM

TECHNICAL FIELD

The present invention relates to a technical field of information processing apparatus, information processing method, and information processing program, and in particular, a technical field of information processing apparatus, information processing method, and information processing program which carry out the processing of input information, such as image information inputted from the outside.

BACKGROUND ART

Recently, a so-called digital video camera for capturing a moving image becomes widespread. In connection therewith, a technique of simply editing a moving image captured by such digital video camera at home is desired.

However, in a conventional so-called editing of moving image, in a case where from a variety of image material including a successful image and an unsuccessful image captured by such digital video camera, for example, only a successful image is continuously reproduced, generally, the following work is necessary: for example, newly editing the captured image after the capturing of image to produce a moving image in which only successful portions are connected to each other, or manually selecting the image material to produce a so-called reproduction list, or selecting image material to be reproduced, and reproducing it each time the image material is reproduced.

In order to respond to the above desire of simple editing, at the time of later editing (reproducing) a moving image captured by such digital video camera, a variety of technique of understanding an intention of person who has captured a moving image to automatically select an important portion from the captured moving image to assist a person (a viewer) who edits the moving image to do a work has been developed, as shown in, for example, the following Patent Document 1, and Patent Document 2.

That is, in the Patent Document 1, the arrangement is as follows: in a video recorder which is capable of capturing both of a moving image and a still image, and records each image in a separate medium, a timing at which a moving image and a still image have been captured simultaneously is regarded as an important scene in a moving image, and a flag is preserved on a recording medium of moving image or still image, and a priority in an editing work is raised for a moving image before and after the timing.

The Patent Document 2 discloses an arrangement in which by specifying a portion whose image signal or audio signal meets a predetermined standard in a captured moving image, a portion of high priority in the moving image is detected. More specifically, the following arrangement is disclosed: for example, a portion in which a face of specific person is image-captured, a portion in which an operation of zoom-in has been carried out at the time of image-capturing, a portion in which a volume of corresponding sound exceeds a predetermined value, or the like is specified as an important portion, and such specified portions are extracted from a file of moving image corresponding to a captured moving picture, and are connected to each other, so that an automatic editing of moving image is carried out for such important portion.

Patent Document 1: Japanese Patent Laid-open No. 2002-359804

Patent Document 2: Japanese Patent Laid-open No. 2002-176613

DISCLOSURE OF THE INVENTION

Problem to be solved by the Invention

In a technique disclosed in Patent Document 1, however, since information of important portion is preserved as timing at which a still image has been captured separately from a moving image, in a case where a work is not carried out between a digital video camera and an editing apparatus which correspond to the same preservation method (that is, a method in which a still picture is preserved as an indication of important portion of moving image), information indicative of importance in a moving image cannot be owned in common. As a result, there is a problem of low degree of general-purpose use.

Further, in a technique disclosed in Patent Document 1, due to an arrangement in which a portion for which a still image has been captured is recognized as an important portion in a moving image, in other words, in order to record information indicative of important portion in a moving image, an operation of "capturing a still image" is required (separately from an operation of capturing a moving image) for an image-capturing person. That is, since it is necessary to be conscious of not only capturing a moving image but also capturing a still image in an important portion as a moving image (an important scene), the concentration on capturing a moving image, of image-capturing person, is disturbed. As a result, there is also the problem that there is a case where a desired moving image cannot be captured.

On the other hand, in a technique disclosed in Patent Document 2, a characterizing feature in a moving image generated during "a usual image-capturing" is only utilized, in other words, a characterizing feature is acquired only in a condition generated during a usual image-capturing. As a result, there is the problem that a portion which an image-capturing person intends to regards as an important portion cannot be necessarily selected as an important portion.

The present invention has been accomplished in consideration of the above problem, and it is an object of the invention to provide an information processing apparatus, an information processing method, and an information processing program which are capable of automating an editing work or the like of captured moving image without providing a specific arrangement, for example, to a moving-image capturing apparatus.

Means for solving the Problem

In order to solve the above problem, the invention of claim 1 relates to an information processing apparatus, comprising:

storing means for storing in advance attribute information indicative of specific attribute set in advance as attribute which input information inputted from the outside and having a change of specific mode set in advance should include, analyzing means for analyzing a change of the input information inputted, and linking means for, based on the analyzed change and the stored attribute information, in a case where the analyzed change is a change of the specific mode, linking the attribute information indicative of the specific attribute corresponding to a change of the specific mode, to the input information having a change of the specific mode.

In order to solve the above problem, the invention of claim 8 relates to an information processing method, comprising:

a storing process of storing in advance attribute information indicative of specific attribute set in advance as attribute which input information inputted from the outside and having a change of specific mode set in advance should include, an analyzing process of analyzing a change of the input information inputted, and a linking process of, based on the analyzed change and the stored attribute information, in a case where the analyzed change is a change of the specific mode, linking the attribute information indicative of the specific attribute corresponding to a change of the specific mode, to the input information having a change of the specific mode.

In order to solve the above problem, the invention of claim 9 relates to an information processing program, causing a computer to function as an information processing apparatus according to any one of claims 1 to 7.

BRIEF DESCRIPTION OF THE DRAWINGS

FIG. 3A is a view generally showing the content of the rule information, and FIG. 3B is a view concretely illustrating the content of the rule information.

FIG. 8A is a flow chart indicative of the operation, and FIG. 8B is a view illustrating a rule setting screen.

FIG. 9A is a block diagram indicative of the configuration, and FIG. 9B is a view generally showing the content of rule information according to the fourth embodiment.

EXPLANATION OF REFERENCE CHARACTERS

Figure 1:
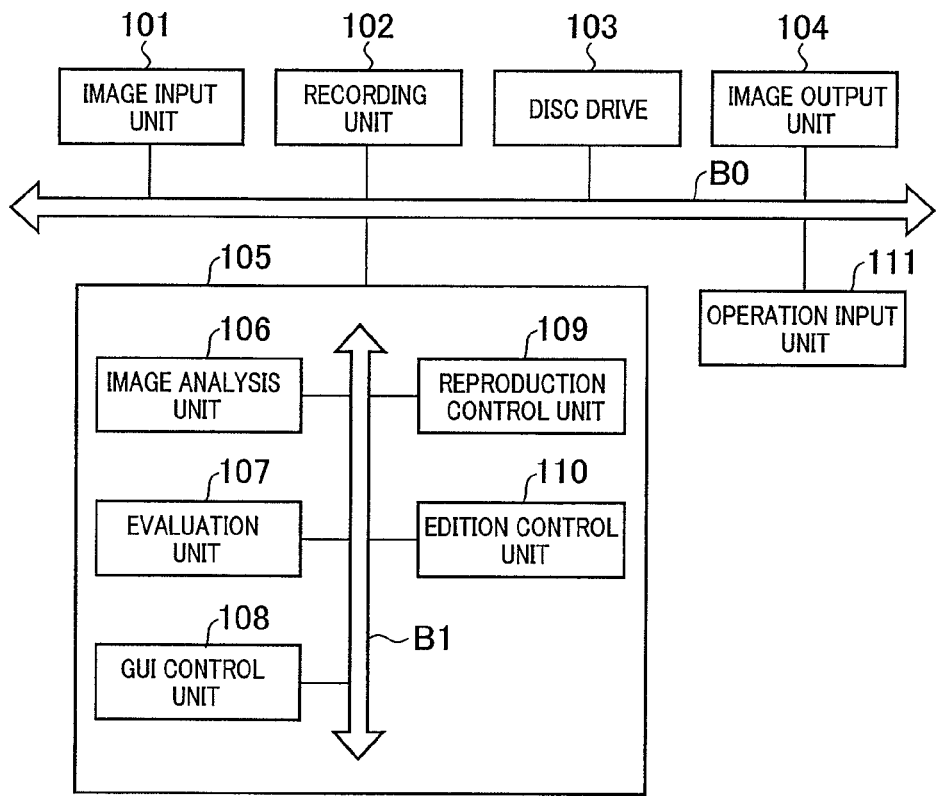
FIG. 1 is a block diagram showing a schematic configuration of information reproduction apparatus according to a first embodiment.

101: image input unit
102: recording unit
103: disc drive
104: image output unit
105: control unit
106: image analysis unit
107: evaluation unit
108: GUI control unit
109: reproduction control unit
110: edition control unit
111: operation input unit
301, 810: rule information
310, 811: condition information portion
320: additional information definition portion
311: image expression information
312: timing information
322: application section information
321: meaning information
400: additional information
501: image-capturing unit
502: encoding unit
600: rule setting unit
601: application rule setting unit
700, 701, 702, 703: setting unit
800: sound input unit
801: sound analysis unit
812: sound expression information
813: sound timing information
S, SS, SA: information reproduction apparatus
BO: outer bus
BI: inner bus
CMR: image-capturing apparatus
RG: GUI screen

BEST MODE FOR CARRYING OUT THE INVENTION

Referring now to the drawings, a best mode for carrying out the invention will be described. The following embodiment is an embodiment in which, in a case where an image (a moving image) captured by a image-capturing person using an image-capturing apparatus such as a digital video camera is reproduced by an information reproduction apparatus, the invention has been applied to the information reproduction apparatus or the image-capturing apparatus itself.

(I) A Principle of the Invention

First, before explaining an embodiment of the invention, a principle of the invention will be explained simply.

In a case where an image is captured by an image-capturing apparatus such as a digital video camera, generally, immediately after each cut (a portion of image) has been captured, an image-capturing person remembers the content of the image, and can make an evaluation such as "an image of this time was successful, and I would like to use it absolutely at the editing time", or "it is not necessary to erase an image at once, but I do not think that I would like to keep it at the editing time".

Therefore, in a case of the invention, immediately after an image has been captured, an evaluation or the like as an intention of image-capturing person (an evaluation or the like for subject to be image-captured) is recorded as a specific operation of the image-capturing person together with a captured image, so that it is not necessary to verify and evaluate the content of the image after the image-capturing.

In addition thereto, an arrangement is that there are a plurality of kinds of information which can be recorded as an evaluation, and an image-capturing person can choose, and use such different kinds of information. Therefore, it is possible to choose, and use an important scene, a scene which is less important than the important scene, a scene in which a specific subject has been image-captured, or the like, in a captured image, and to record (keep) information indicative of evaluation of each image. Further, for example, by judging the number of specific operation at the time of capturing an image, it is possible to add the meaning including "expression of number" to a captured image simply.

(II) First Embodiment

Referring now to FIG. 1 to FIG. 5, an first embodiment of the invention based on the above principle will be described.

Figure 2:
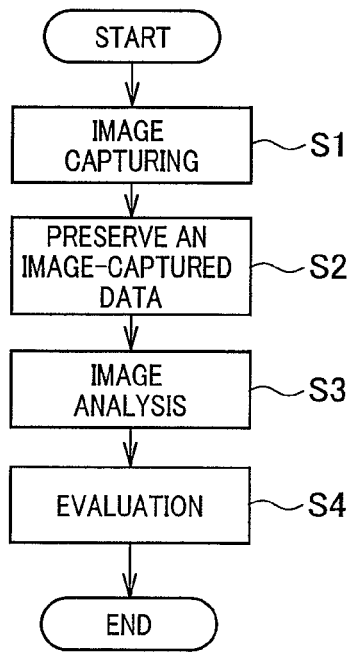
FIG. 2 is a flow chart showing an operation of information reproduction apparatus according to the first embodiment.
Figure 3A:
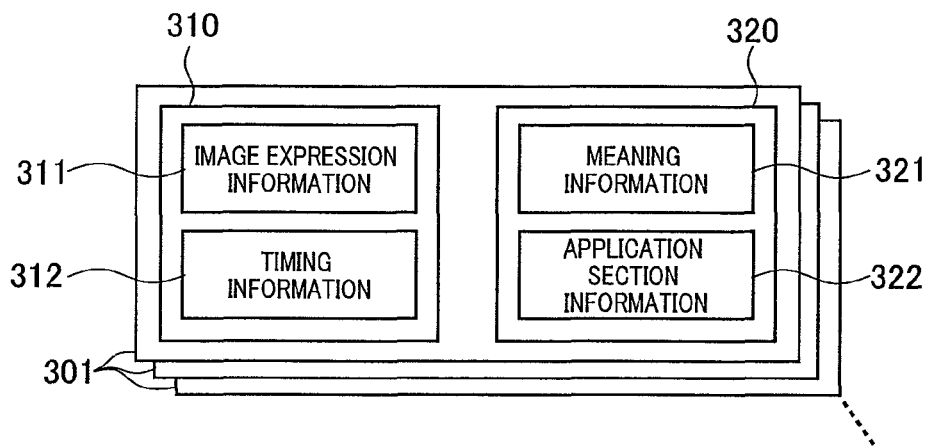
FIGS. 3A and 3B are views showing the content of rule information according to the first embodiment.
Figure 3B:
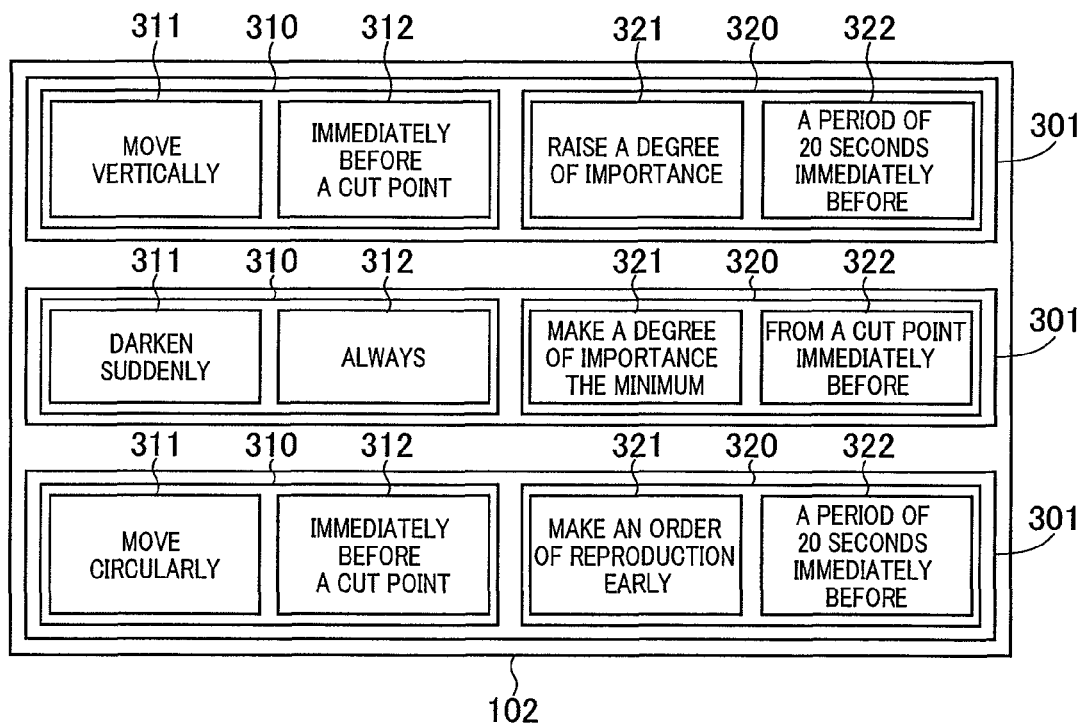
Figure 4:
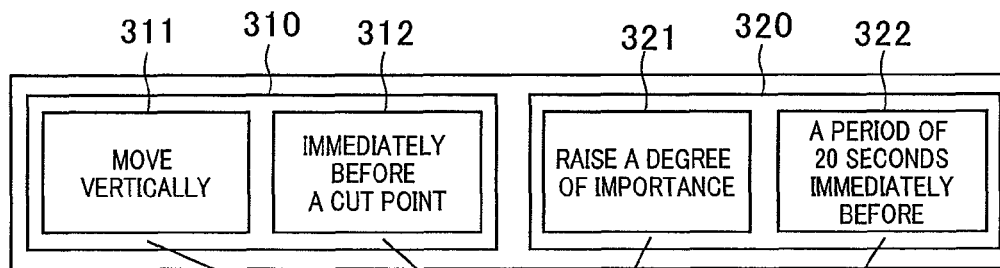
FIG. 4 is a view illustrating the relationship between the content of the rule information and image material according to the first embodiment.
Figure 5:
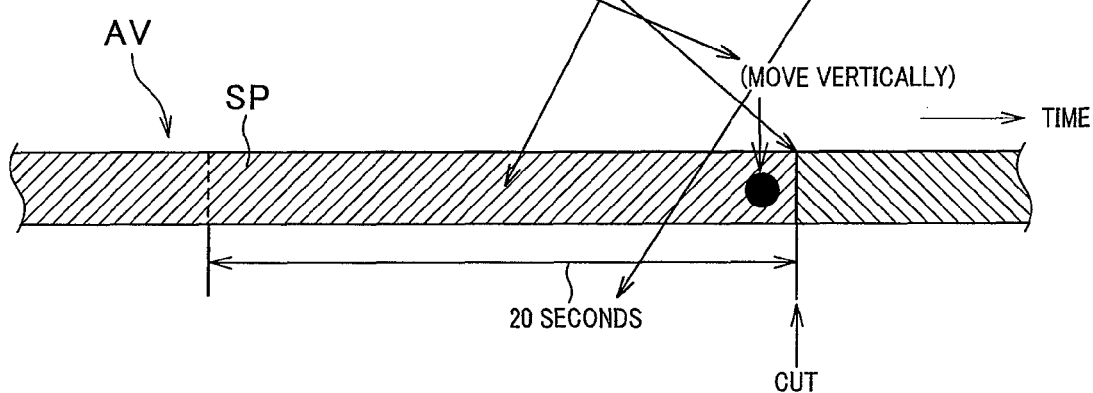
FIG. 5 is a view illustrating the content of additional information according to the first embodiment.

FIG. 1 is a block diagram showing a schematic configuration of information reproduction apparatus according to a first embodiment. FIG. 2 is a flow chart showing an operation of the information reproduction apparatus. FIGS. 3A, and 3B, and FIG. 4 are views explaining rule information according to the first embodiment. FIG. 5 is a view illustrating additional information according to the first embodiment.

As shown in FIG. 1, an information reproduction apparatus S according to the first embodiment is arranged to include the following units:

an image input unit 101, a recording unit 102 as storing means which is composed of a so-called hard disc, and hard disc drive, or the like a disc drive 103 which is capable of recording and reproducing information in and from an optical disc not shown, an image output unit 104 which is composed of a liquid crystal display or the like, a control unit 105, an operation input unit 111 which is composed of an operation button, a remote control device, or the like.

The image input unit 101, the recording unit 102, the disc drive 103, the image output unit 104, the control unit 105, and the operation input unit 111 are connected to each other by an outer bus BO in such a way that the transmission of data is possible.

The control unit 105 is arranged to include an image analysis unit 106 as analysis means, an evaluation unit 107 as linking means, a GUI (Graphical User Interface) control unit 108, a reproduction control unit 109, and an edition control unit 110. The image analysis unit 106, the evaluation unit 107, the GUI control unit 108, the reproduction control unit 109, and the edition control unit 110 are connected to each other by an inter bus BI in such a way that the transmission of data is possible.

Now, an operation of the whole will bed described.

First, image information as an analogue signal corresponding to an captured image with sound is inputted to the image input unit 101 from an image-capturing apparatus not shown. The image input unit 101 makes a process of converting to a recording format at the time of recording the image information in the recording unit 102, i.e., for example, makes a digital conversion of the image information, and encodes it by a method of MPEG (Moving Picture Expert Group) 2, and outputs it as encoded image data through the outer bus BO to the recording unit 102.

Thus, the recording unit 102 records the encoded image data encoded by the image input unit 101 as image material.

The image output unit 104 decodes the encoded image data recorded in the recording unit 102, and displays it, and if necessary, multiplexes a so-called GUI image or the like produced by the control unit 105, with the encoded image data, and outputs it.

At this time, the disc drive 103, under the control of the control unit 105, acquires the encoded image data recorded in the recording unit 102 through the outer bus BO, and records it in the optical disc or the like.

On the other hand, the control unit 105 is concretely arranged to include a calculation apparatus such as CPU, a volatile memory, and a non-volatile memory. Based on an operation by a user carried out in the operation input unit 111, the control unit 105 carries out a process of the first embodiment corresponding to a program read in the memory, and further, controls each unit of the information reproduction apparatus S.

Now, an operation of the image analysis unit 106 or the like which constitutes the control unit 105 will be described. The image analysis unit 106, the evaluation unit 107, the GUI control unit 108, the reproduction control unit 109, and the edition control unit 110 are realized by a software process carried out by the control unit 105 based on the program.

That is, first, the image analysis unit 106 analyzes whether there is an image expression included in "a rule" according to the first embodiment, in image material corresponding to encoded image data recorded in the recording unit 102.

Here, the rule is a rule of linking an image expression included as an image in the image material, with specific meaning used at the editing time in an information reproduction apparatus S according to the first embodiment, and is set in advance, and is recorded in the recording unit 102. The rule will be concretely described in detail later.

Now, the evaluation unit 107 compares an analysis result of the image analysis unit 106 with the rule, and prepares additional information indicative of partially, for example, importance or the like for the image material (concretely, information to be added to image information in a form of a so-called meta data), and causes it to be recorded in the recording unit 102 in a linked condition with the original image material.

On the other hand, the reproduction control unit 109, based on a instruction operation of reproduction or the like carried out by a user in the operation input unit 111, refers to additional information added to original image material as an evaluation result of the evaluation unit 107, and reads a portion or the whole of image material whose reproduction has been instructed in image material recorded in the recording unit 102, and outputs it through the image output unit 104.

Further, the edition control unit 110, similarly, based on an operation of the operation input unit 111, and the additional information, carries out an edition process of the image material (concretely, an edition process such as division of originally continuous image material, erase of a portion or the whole, or addition of specific image effect).

In parallel therewith, the GUI control unit 108 manages a process of menu screen production or the like for so-called GUI display. More concretely, the GUI control unit 108 outputs the produced menu screen through the image output unit 104, and fixes the content of the operation in accordance with the content of the menu screen based on an operation carried out in the operation input unit 111, and further, outputs a control signal or the like based on the content of the operation to the other units which constitute an information reproduction apparatus S. That is, for example, at the reproduction time of image material, a menu screen is displayed to cause a user to choose image material to be reproduced, and the result is outputted to the reproduction control unit 109 to cause an actual reproduction to be carried out.

Referring now to FIG. 2 to FIG. 6, the processing of information carried out by an information reproduction apparatus S according to the first embodiment will be described concretely.

First, a process of step S1 shown in FIG. 2 is carried out in an image-capturing apparatus not shown in FIG. 1. Processes of and after step S2 are carried out in an information reproduction apparatus S according to the first embodiment.

As shown in FIG. 2, as a the processing of information according to the first embodiment, first, an image-capturing person captures a desired moving image (video) using an image-capturing apparatus which he operates himself (step S1). At this time, the image-capturing person, in accordance with his own judgment during the image-capturing, incorporates an image expression defined in advance as the rule, and captures a moving image.

Here, the rule according to the first embodiment, and recorded in the recording unit 102 in a condition in which an image expression and meaning are linked to each other in advance, will be described concretely.

The rule is a rule which defines in advance the relationship between a specific mode (for example, a specific image expression) included in image material of subject (i.e., image material including a moving image captured at the step S1), and "specific meaning" which is linked to the specific mode. That is, in a case where there exists an image portion of the specific mode in image material of subject, "specific meaning" which is in advance linked to the specific mode is given to a portion or the whole of image material including the image portion (i.e., the additional information is added). The rule is recorded in the recording unit 102 as rule information corresponding thereto.

Referring now to FIGS. 3A, and 3B, a configuration of rule recorded as the rule information will be described.

As shown in FIG. 3A, one piece of rule information 301 is composed of a condition information portion 310 and an additional information definition portion 320. In a case where image material has been brought into conformity with a condition written in the condition information portion 310, additional information corresponding to meaning written in the additional information definition portion 320 is added to the image material.

More concretely, the condition information portion 310 includes, for example, image expression information 311 and timing information 312.

At this time, the content of image expression included in an image captured at the time when an image-capturing person (see step S1 in FIG. 2) himself who uses an image-capturing apparatus carries out an operation or a process of the image-capturing apparatus during the image capturing is written, in the image expression information 311. A time condition corresponding to an image expression written as the image expression information 311 is written in the timing information 312. In a case where both of these two have been brought into conformity with each other at the same time in the captured image material, the rule will applies.

An explanation will be made, giving an actual example. In a case of usual image-capturing, the content of image expression which does not appear as long as an image-capturing person does not intend is written in the image expression information 311.

For example, an image expression such as simple "zooming" or "moving a camera laterally" is often used in a usual image-capturing, and is an image expression which is difficult to avoid, so it does not correspond to an image expression according to the first embodiment.

On the other hand, an image expression according to the first embodiment is an image expression "which cannot occur in a case where there is no conscious performance". Concretely, the following image expressions are considered:
    moving an image-capturing apparatus itself vertically several times,
    moving an image-capturing apparatus itself circularly,
    capturing an image of ground,
    capturing an image of sky, and
    darkening suddenly (for example, covering a lens portion with a hand).

Further, in addition thereto, the following image expressions by using hand properties are considered:
    using a finger, and carrying out a specific movement in front of a lens, and
    capturing an image of paper on which a character or a bar-code has been written.

That is, for example, it is also possible to change the meaning or a degree of information added thereto (for example, the length of application section of meaning, the height of importance, or the like) in accordance with the times at which an image-capturing apparatus itself has been moved vertically or the movement of hand in front of a lens.

On the other hand, as mentioned above, a time condition indicative of timing at which each image expression should be included in the rule is written in the timing information 312.

More concretely, for example, in a case where a condition of "immediately before a cut point" is linked with an image expression of "moving vertically", even if the corresponding specific image expression (in this case, "moving vertically") is included at a timing other than a timing immediately before a cut point in image material, a rule corresponding thereto does not apply. Thus, for example, even if an image-capturing person bumps against something so that he erroneously moves an image-capturing apparatus itself vertically (i.e., unintentionally), in a case where an image-capturing is not terminated immediately thereafter, a cut point does not occurs immediately after a specific image expression of "moving vertically". Therefore, the corresponding rule does not apply to image material which was captured at that time. In this case, if the rule is desired to be actually applied to image material captured at that time, it is sufficient to newly carry out such image expression immediately before the end of image-capturing.

In a case shown in FIG. 3, a case where two pieces of information of the image expression information 311 and the timing information 312 constitute the condition information portion 310 has been described. It is not limited thereto. For example, it is possible that an image expression and a timing at which that image expression should be carried out are put together into one piece of image expression information 311 so that the condition information portion 310 is arranged only by the image expression information 311, such as "cutting after an image-capturing apparatus itself is moved vertically several times".

On the other hand, the additional information definition portion 320 includes the application section information 322 and the meaning information 321.

At this time, the meaning included as the meaning information 321 is concretely as follows:
    giving the image material a high score,
    giving the image material a low score,
    using the image material as a title (i.e., for example, as a heading at the time of automatic reproduction or edition),
    moving toward the front as a reproduction order,
    making it not-image-captured, and
    making it pertain to a specific category (for example, a category A).

Further, in the application section information 322, a section to which the meaning is added as mentioned above (a section as a time range in image material) is written, for example, in the form of "from a cut point immediately before to the image expression" or "## seconds immediately before the image expression".

For each of the image expression information 311, the timing information 312, the meaning information 321, and the application section information 322, a plurality of combinations of different contents are in advance recorded as the rule information 301 (see FIG. 3A), and therefore, as shown in FIG. 3B, for example, a plurality of pieces of the rule information 301 corresponding to the followings are recorded in the recording unit 102:
    "whenever there is an expression of darkening a screen suddenly, give a low score to a section 20-seconds immediately before the image expression", or "in a case where there is an image expression of moving a camera vertically several times immediately before a cut point, give a high score to a section from a cut point immediately before the expression, to the expression".

Referring now back to a step S1 in a flow chart of FIG. 2, for example, when a rule illustrated in FIG. 3B is used, in a case where an image-capturing person thinks that he desires to give a high score to a moving image captured at that time (an intention of image-capturing person corresponds to, for example, "a desire in which the present portion is automatically selected by an information reproduction apparatus S later"), he moves an image-capturing apparatus vertically before a timing of end of image-capturing (i.e., a cut point), and immediately thereafter, operates "a recording-end button" not shown in an image-capturing apparatus (see the rule information 301 shown in the uppermost column of FIG. 3B).

Now, after an image-capturing person has captured an image including the specific image expression (step S1), the captured moving image is inputted as image material into an information reproduction apparatus S, and it is recorded as a group of encoded image data in the recording unit 102 (step S2).

After that, for a group of the recorded encoded image data, the same image analysis as conventional one is made in the image analysis unit 106, and it is determined whether there is an image portion corresponding to a specific image expression written in the image expression information 311 in each of the rule information 301 (step S3).

At a process of step S3, in a case where there is an image portion which is in conformity with a certain rule, additional information is produced in accordance with the conformed rule in the evaluation unit 107, and it is recorded (preserved) in the recording unit 102 in the linked relationship with the image material.

That is, concerning the processes of the step S3 and the step S4, concretely, at the step S3, it is first judged whether an image expression written as the image expression information 311 in each of the rule information 301 is included in a group of encoded image data which is the subject of analysis.

For example, as illustrated in FIG. 4, in an encoded image data AV recorded in the recording unit 102 (a title of the encoded image data AV is referred as, for example, "0001"), in a case where there exists an image expression of "moving vertically" at a position 32-seconds after the start, the rule information 301 which includes an image expression of "moving vertically" as the image expression information 311 is extracted from the rule information 301 indicative of a rule which is applied to the encoded image data AV.

As a result, in the extracted rule information 301 (see FIG. 4), a condition of "immediately before a cut point" is written as the timing information 312.

When the encoded image data AV is further analyzed, a cut point can be detected, so that an encoded image data AV immediately until the cut point is in conformity with a condition written as the condition information portion 310 in the extracted rule information 301.

Thus, the evaluation unit 107, in accordance with a condition written in the additional information definition portion 320 at this time in the extracted rule information 301, adds additional information indicative of "raising importance", to encoded image data SP corresponding to 20-seconds immediately before a timing at which an image expression of "moving vertically" is included (see the step S4 in FIG. 2).

Referring now to FIG. 5, the content of additional information added to each encoded image data AV will be described concretely.

As shown in FIG. 5, in a case of an example shown in FIG. 4, for an encoded image data SP corresponding to a section from 0 hour, 00 minute, 12 seconds to 0 hour, 00 minute, 32 seconds in an encoded image data AV titled "0001", additional information 400 in which a value of "SCORE" which is a parameter indicative of importance is "100", is added, and is newly recorded in the recording unit 102. Thus, a value of parameter SCORE in the additional information 400 corresponding to the encoded image data SP becomes to a value which indicates higher importance than the other portions in the encoded image data AV.

As explained above, in accordance with an operation of an information reproduction apparatus S of the first embodiment, an image-capturing person analyzes an image expression left in image material, and gives the meaning in accordance with an intention of the image-capturing person to the image material. Therefore, for example, in a selection menu display or the like on which a user including an image-capturing person selects image material which is the subject of reproduction or edition, it is also possible to reflect the content of the additional information 400. That is, for example, the following process is possible: to display image material with high importance (i.e., a value of parameter SCORE is high) in an upper portion of selection menu, or to give a mark to the corresponding image material in accordance with its importance, or not to display image material with low importance in a selection menu.

Therefore, by using a result of selection of image material carried out at the time of image-capturing based on an evaluation of image-capturing person, it is possible to reduce a load in a work of newly evaluating an image at the time of viewing or editing the image material later.

That is, in accordance with an operation of information reproduction apparatus S of the first embodiment, the rule information 301 corresponding to a specific image expression is stored in advance, and when a change of inputted image material is a specific image expression, the rule information 301 indicative of specific attribute corresponding to the specific image expression is linked therewith. Therefore, without providing a specific arrangement in an image-capturing apparatus at the time of image-capturing of image material itself, a specific rule can be linked with the produced image material, and a specific rule can be linked with the content itself of a portion or the whole of image material.

Therefore, it is possible to simply automate a process or the like of edition work corresponding to a rule after image material has been acquired.

Further, based on the linked rule information 301, a process corresponding to a rule indicated by the rule information 301 is carried out for image material to which the rule information 301 has been linked. Therefore, an adequate process in conformity with the content itself of image material can be carried out for the image material.

Further, since a process for image material is, for example, one of a reproduction process of the image material, an erase process of the image material, or a giving process of specific effect, a process based on the content itself of image material can be carried out with a simple arrangement.

Furthermore, since a specific image expression which is the subject of linking of the rule information 301 is at least one of a time change of image material or an change of image included in image material, it is possible to carry out the linking of rule information 301 in accordance with a change which can be accurately analyzed.

Further, since the rule information 301 is linked in terms of linking with a specific image expression included in a moving image as image material corresponding to a specific movement in an image-capturing apparatus, it is possible to link a specific rule to image material itself, without providing a specific arrangement in an image-capturing apparatus itself.

Further, since the content of the rule information 301 includes the timing information 312, the meaning information 321, and the application section information 322, it is possible to adequately link an attribute in accordance with the characteristic of image material.

(III) Second Embodiment

Figure 6:
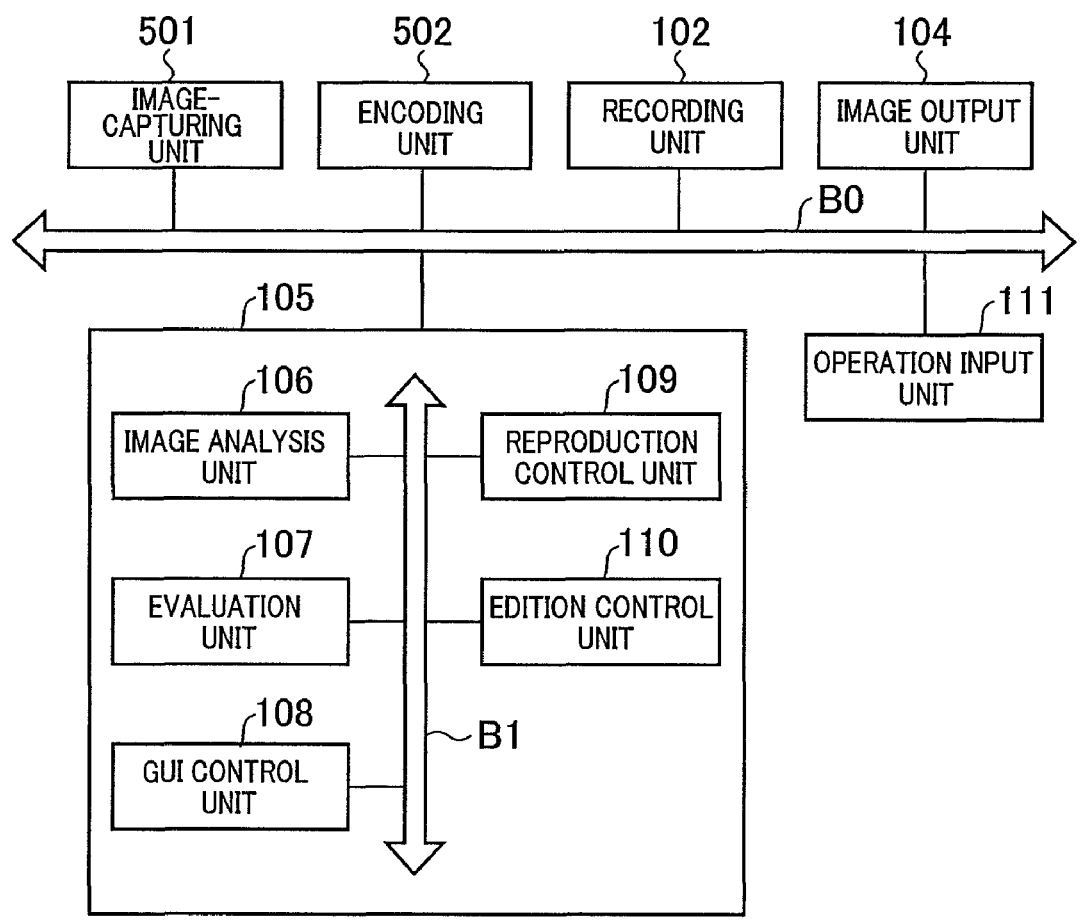
FIG. 6 is a block diagram showing a schematic configuration of image-capturing apparatus according to a second embodiment.

Referring now to FIG. 6, a second embodiment which is another embodiment of the invention will be described. FIG. 6 is a block diagram showing a schematic configuration of image-capturing apparatus according to a second embodiment. The same reference numerals are added to the same constituent elements as an information reproduction apparatus S according to the first embodiment, and an explanation of detailed portions will be omitted.

In the first embodiment mentioned above, a case where the invention is applied to an information reproduction apparatus S to which image material captured in an image-capturing apparatus not shown in FIG. 1 is inputted, has been described. A second embodiment mentioned below is an embodiment in which constituent elements for analysis of image material according to the invention are provided to an image-capturing apparatus itself.

That is, as shown in FIG. 6, an image-capturing apparatus CMR according to the second embodiment is concretely realized as a digital video camera, and instead of the image input unit 101 in an information reproduction apparatus S according to the first embodiment, it comprises an image-capturing unit 501 including a lens unit, and an encoding unit 502. These are connected to a control unit 105 or the like through an outer bus BO.

In this arrangement, the image-capturing unit 501 converts light received through a lens unit not shown, to an electric signal, and then, converts it to a digital image, and outputs it to the encoding unit 502.

Thus, the encoding unit 502 records encoded image data corresponding to the converted digital image in a recording unit 102 through the outer bus BO.

An arrangement subsequent thereto such as a control unit 105 is basically the same as that of information reproduction apparatus S according to the first embodiment, so an explanation of the detailed portions will be omitted.

Now, an operation will be described.

First, in terms of the point that rule information 301 corresponding to the above rule is set/recorded in advance before an image is captured, this embodiment is the same as an information reproduction apparatus S according to the first embodiment.

When image material is captured, similarly with a case of the first embodiment, the image analysis unit 106 detects an image expression included in the rule information 301 in such a way that encoded image data corresponding to the captured image material is the subject, and the evaluation unit 107 produces additional information 400 corresponding to the detection result. Thus, the produced additional information 400 and encoded image data corresponding thereto are linked with each other, and recorded in the recording unit 102.

At this time, it is possible to later set a new rule to encoded image data which has been once captured and further image-analyzed, and make an application thereof.

On the other hand, in a case where encoded image data recorded in the recording unit 102 is outputted to the outside for a reproduction process, an edition process, or the like, for example, the reproduction control unit 109, based on the content of additional information 400 linked to encoded image data to be outputted to the outside, selects the encoded image data, and outputs it, so that an automatic reproduction can be realized.

Further, it is also possible to arrange to automatically select encoded image data similarly based on the additional information 400, and make an edition list, and make an edited image in which they are connected with each other, and output it to the outside.

Further, it is also possible to arrange to, by a GUI control unit 108, display the content of rule information 400 indicative of presently usable rule in a so-called view finder or the like which constitutes an image output unit 104 as an image-capturing apparatus CMR during a period of time of image-capturing, so that an image-capturing person captures an image, while checking the rule.

Further, such an arrangement is also possible that once an image-capturing person has captured one image cut, he analyzes it, and if an image just captured is not necessary, it is automatically erased, or a selection screen such as "do you erase it?" is displayed, and an erase process or a non-erase process is selected with a simple operation.

As mentioned above, in accordance with an operation of image-capturing apparatus CMR of the second embodiment, by carrying out an image-analysis process in an image-capturing apparatus CMR itself, it is possible to automatically edit in the image-capturing apparatus CMR. Further, it is possible to shorten a period of time required for a case where all of image are preserved in an image processing apparatus not shown in FIG. 6, and then are analyzed. That is, once an image-capturing person returns to his home, and connects an image-capturing apparatus CMR to an image processing apparatus, he can see an automatically edited image.

Further, in a case where an image captured by an image-capturing apparatus CMR is a failure, it is possible to easily erase an image corresponding to the failure at that place, so it is possible to effectively utilize a recording unit 102 in the image-capturing apparatus CMR.

(IV) Third Embodiment

Figure 7:
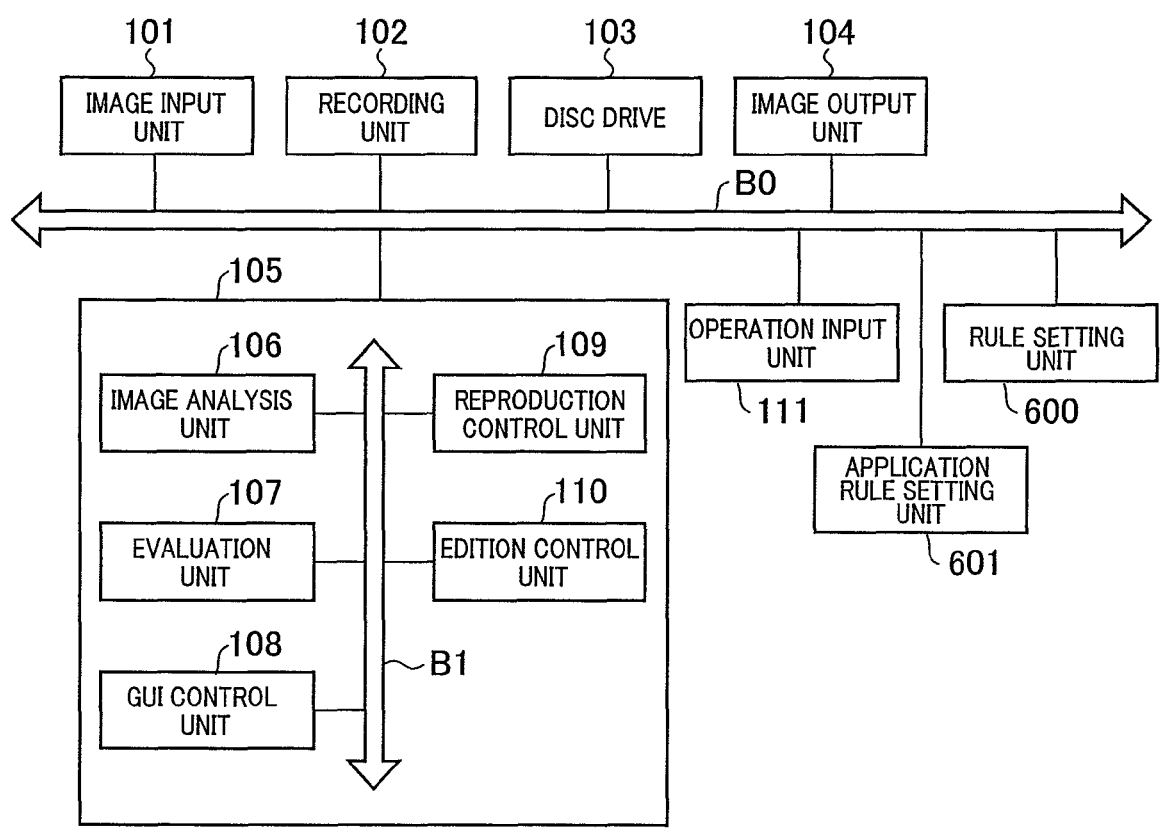
FIG. 7 is a block diagram showing a schematic configuration of information reproduction apparatus according to a third embodiment.
Figure 8A:
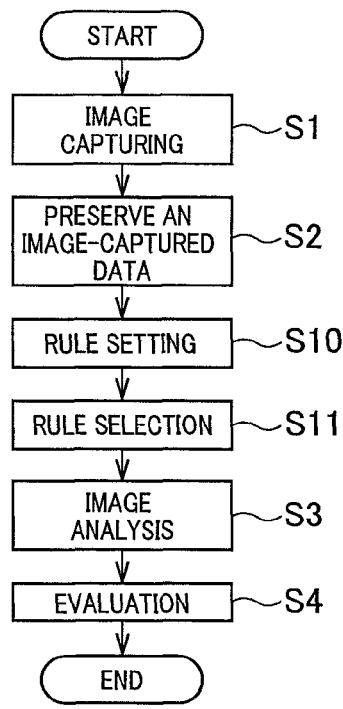
FIGS. 8A and 8B are views showing an operation of information reproduction apparatus according to the third embodiment.
Figure 8B:
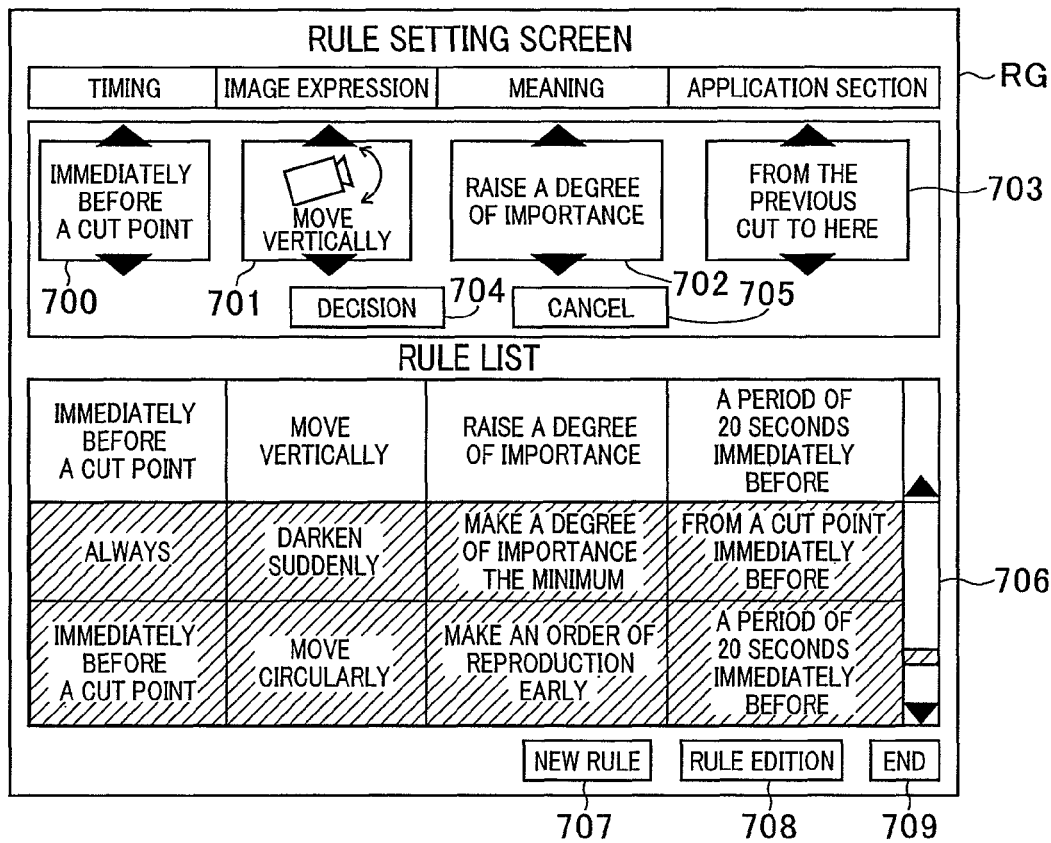

Referring now to FIG. 7, and FIGS. 8A and 8B, a third embodiment which is the other embodiment of the invention will be described. FIG. 7 is a block diagram showing a schematic configuration of information reproduction apparatus according to the third embodiment, and the same reference numerals are added to the same constituent elements as an information reproduction apparatus S according to the first embodiment, and an explanation of detailed portions will be omitted. Further, FIGS. 8A and 8B are views showing an operation of information reproduction apparatus according to the third embodiment, and the same step numerals are added to the same operations as an information reproduction apparatus S according to the first embodiment, and an explanation of its details will be omitted.

In the first embodiment mentioned above, an explanation has been made in a situation where the rule information 301 is recorded in the recording unit 102 in advance. However, in the third embodiment mentioned below, the content of the rule information 301 is arranged to be able to be changed by a user.

That is, an information reproduction apparatus SS according to the third embodiment includes an information reproduction apparatus S according to the first embodiment, and a rule setting unit 600 and an application rule setting unit 601.

At this time, the rule setting unit 600 sets rule information 301 corresponding to a new rule, in a mode which a user, i.e., a person for editing captured image material or the like desires, by an operation through the operation input unit 111. At this time, concretely, a specific image expression which should be included in image material which is the subject of edition, and the meaning corresponding to the image expression, and the other condition are combined with each other to produce rule information 301 corresponding to a new rule. The produced new rule information 301 is recorded in the recording unit 102 similarly with a case of the first embodiment.

On the other hand, the application rule setting unit 601, in a case where certain image material is automatically reproduced or the like, sets which rule (one or plural) applies, from a rule newly produced by using the rule setting unit 600, and a rule prepared in advance and recorded in the recording unit 102. At this time, in a case where a rule to be applied is not specifically designated by a user, a rule which has been initially set (i.e., which has been recorded in the recording unit 102 in advance) is applied.

Referring now to FIGS. 8A and 8B, information processing in an information reproduction apparatus SS according to the third embodiment mentioned above will be concretely described.

In the information processing, as shown in FIG. 8A, first, the same process as an information reproduction apparatus S according to the first embodiment is carried out (steps S1 and S2).

Now, by using the operation input unit 111 and the rule setting unit 600, a new rule is set (step S10).

That is, in a process of step S10, the GUI control unit 108 displays a GUI screen for rule-setting managed by itself, to the image output unit 104.

At this time, as an example of the GUI screen RG, a screen shown in FIG. 8B is thought. A user, while displaying the GUI screen RG, first, selects/sets the condition information portion 310 for determining whether a result of image analysis applies to the rule, and the additional information definition portion 320 added to such image material when the result has applied to the rule, so as to newly produce the rule information 301. At the time of selection/setting, concerning the timing information 312 and the additional information definition portion 320, one for the pre-produced rule information 301 may be used, or a user himself may produce newly. At this time, concerning the image expression information 311, it is desirable to use one defined in advance together with an algorithm for detecting the corresponding image expression from image material.

Now, after a rule setting has been completed, a user selects a rule to be applied to image material (encoded image data) which is the subject of the present edition in the set rule (step S11), and then, the same analysis process as an information reproduction apparatus S according to the first embodiment or the like is carried out (steps S3, and S4).

Here, a GUI screen RG illustrated in FIG. 8B will be described in detail.

In the GUI screen RG, in a case where the condition information portion 310 is set, setting portions 700, and 701 are used, and by operating black arrows located at an upper portion and a lower portion of each of the setting portions 700, and 701 by the operation input unit 111, each candidate to be adopted as the image expression information 311 and the timing information 312 in the condition information portion 310 is cyclically selected. Further, in a case where the additional information definition portion 320 is set, setting portions 702, and 703 are used, and by operating black arrows located at an upper portion and a lower portion of each of the setting portions 702, and 703 by the operation input unit 111, each candidate to be adopted as the meaning information 321 and the application section information 322 in the additional information definition portion 320 is cyclically selected. The GUI screen RG includes a cancel button 705 for canceling information once selected, and a decision button 704 for deciding information selected.

Further, in a case where a set rule is selected (see the above step S11), or an existing rule is edited again, a new-rule setting button 707, a rule edition button 708, or an end button 709 is used from rules selectable at that time and displayed in a list display portion 706 in the GUI screen RG, and the re-edition or the like is carried out. In the list display portion 706 in FIG. 8B, it is shown that a rule displayed at the uppermost is being edited.

It is possible that a plurality of the rules are collected, and defined as "a rule set", and a rule to be applied to one image material can be selected in terms of a unit of set.

Further, the steps S10 and S11 may be basically carried out at any timing with regard to an image-capturing process (step S1). However, it is necessary to capture an image with a rule (or a rule set) to be kept in mind.

As mentioned above, in accordance with an operation of information reproduction apparatus SS of the third embodiment, in addition to the result of information reproduction apparatus S of the first embodiment, since the content of the rule information 301 can be changed, a rule to be linked to image material can be changed in conformity with the preference of user of information reproduction apparatus SS or the like.

More concretely, in a case where a rule is set in advance, it is thought to set in advance, for example, a rule of degree of abstraction such as "an important scene" which anyone can utilize. However, it is difficult to set in advance a detailed rule in conformity with the requirements of specific user. It is difficult to maintain information in conformity with a specific condition of user such as "a portion in which an image of ## has been captured".

Consequently, in a case of arrangement in which a user can originally set a rule like an information reproduction apparatus SS according to the third embodiment, the carrying-out of desired process for image material can be simply set as a rule.

(V) Fourth Embodiment

Figure 9A:
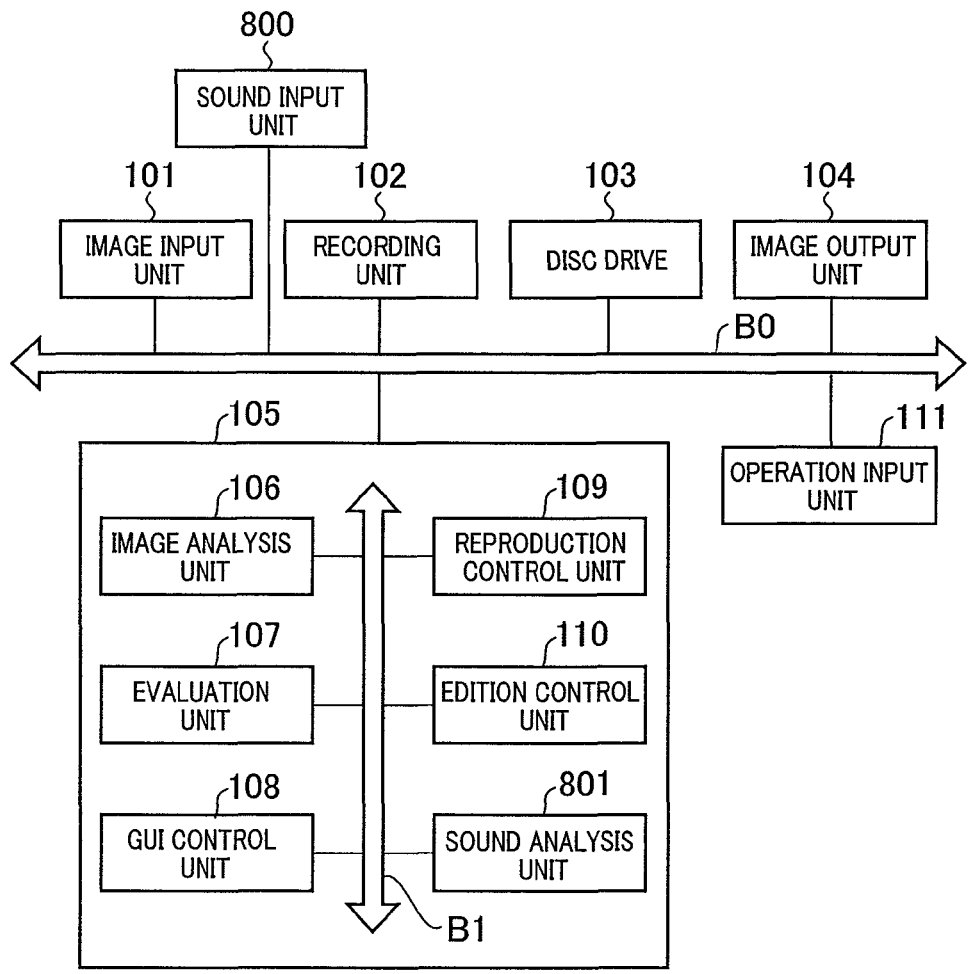
FIGS. 9A and 9B are views showing a configuration of information reproduction apparatus according to a fourth embodiment.
Figure 9B:
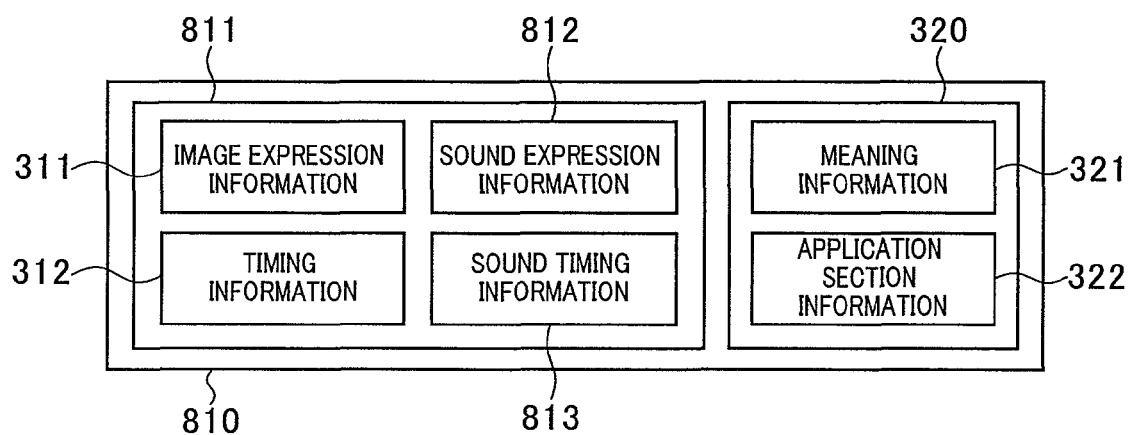

Finally, referring to FIGS. 9A and 9B, a fourth embodiment which is still another embodiment of the invention will be described. FIG. 9A is a block diagram showing a schematic configuration of information reproduction apparatus according to the fourth embodiment, and the same reference numerals are added to the same constituent elements as an information reproduction apparatus S according to the first embodiment, and an explanation of detailed portions will be omitted. Further, FIG. 9B is a view showing a configuration of rule information according to the fourth embodiment, and the same reference numerals are added to the same information as rule information 301 according to the first embodiment, and an explanation of details will be omitted.

In an information reproduction apparatus according to the fourth embodiment mentioned below, in addition to an operation of information reproduction apparatus S according to the first embodiment, sound is also used as a key of linking of rule.

That is, an information reproduction apparatus SA according to the fourth embodiment includes an information reproduction apparatus S according to the first embodiment, and a sound input unit 800 connected to the outer bus BO and a sound analysis unit 801 connected to the inner bus BI.

In this arrangement, when image material is inputted from the image input unit 101, and sound material corresponding to the image material is inputted from the sound input unit 800, the image analysis unit 106 analyzes whether an image expression included in the existing rule is included in the image material. Further, the sound analysis unit 801 analyzes whether a sound expression (mentioned later) included in the rule is included in the sound material.

Here, as a process carried out by the sound analysis unit 801, concretely, the sound analysis unit 801 may carry out, for example, a simple process such as the determination of magnitude of sound level in inputted sound material. However, it is possible to arrange to carry out a so-called speech recognition process (i.e., the recognition of content of speech).

Based on the respective analysis results of the image material and the sound material, the evaluation unit 107 produces additional information 400 to be added to the material, and records it in the recording unit 102. After that, the carrying-out of reproduction process, edition process, or the like for such material in such a way that the content of the additional information 400 is reflected is the same as each embodiment mentioned above.

Referring now to FIG. 9B, rule information according to the fourth embodiment will be described in detail.

As shown in FIG. 9B, rule information 810 according to the fourth embodiment, instead of condition information portion 310 in rule information 301 according to the first embodiment, comprises a condition information portion 811 including image expression information 311, timing information 312, sound expression information 812, and sound timing information 813.

At this time, as a sound expression corresponding to the sound expression information 812, for example, the followings are thought:

tapping a microphone (the sound input unit 800),
tapping a microphone with a specific rhythm,
speaking a specific word so as to be able to be recorded, and
speak a word set in advance by a user so as to be able to be recorded.

Here, in order to use "a word set in advance by a user" as a sound expression, the user need to record the word in the recording unit 102 in advance.

As mentioned above, in accordance with an operation of information reproduction apparatus SA of the fourth embodiment, in addition to the effect of information reproduction apparatus according to the first embodiment, since a sound expression can be also used for the linking of rule, it is possible to more accurately analyze image material, and carry out the linking with a rule.

In an information reproduction apparatus SA according to the fourth embodiment mentioned above, by setting the relationship between an image expression and a sound expression, it is also possible to combine a sound expression and an image expression, and utilize them.

More concretely, for example, the following relationships can be utilized as a key of linking with a rule:

after a specific image expression has been carried out, carrying out a specific sound expression, carrying out a specific image expression and a specific sound expression at the same time, and carrying out one of a specific image expression and a specific sound expression.

Further, in a case where the condition information portion 811 is seen as the whole, for example, the followings can be utilized as a rule:

immediately before a cut point, hiding a lens with a hand, and tapping a microphone several times, and after a camera has been moved several times, always speaking a specific word so as to be able to be recorded.

Based on the above, it is possible to further extend a range of expression of encoded image data to be kept together with material at the time of image-capturing.

That is, more concretely, for example, in a case where only an image is used to record a certain meaning word, an operation such as writing it on paper and capturing an image thereof is necessary. However, in case of sound, it is possible to acquire, what an image-capturing person has spoke, by speech recognition, and use it.

Here, as compared with the point that an image-capturing person changes an image expression intentionally, sound is subject to an area outside an intention of an image-capturing person, by peripheral environment (for example, speech of person to be image-captured, or the like).

Therefore, by combining an image expression and a sound expression, in such a way that the intention of image-capturing person is reflected, it is possible to utilize a wide expression of sound.

In each embodiment mentioned above, a case where the invention is applied to, for example, an image-capturing apparatus such as a digital video camera, and an information reproduction apparatus such as a player, has been described. However, in addition thereto, more concretely, for example, the invention can be also applied to the following apparatuses:

a digital video recorder (DVD recorder, HDD (Hard Disc Drive) recorder, DVD/HDD recorder, home server, or the like), a digital video camera, a digital still camera, a car navigation apparatus, a computer-related apparatus (personal computer, computer peripheral apparatus, portable terminal, portable information terminal, portable telephone, game apparatus for consumer), and the other, all apparatuses which deal with a digital image.

Further, it is also possible to record in advance a program corresponding to a flow chart shown in FIG. 2 or FIG. 8A in an information-recorded medium such as a flexible disc or a hard disc, or acquire and record in advance it through an internet or the like, and read and carry out it by a general-purpose computer, so as to utilize the computer as a control unit 105 in each embodiment.

The invention claimed is:

1. An information processing apparatus, comprising:
a storing device which stores in advance attribute information indicative of specific attribute set in advance as attribute to be provided by input information, the input information being inputted from the outside and including a change of specific mode set in advance and a moving image,
a detecting device which detects a change of the input information inputted, and
a linking device which, based on the change as detected and the attribute information as stored, in a case where the change as detected is a change of the specific mode, links the attribute information indicative of the specific attribute corresponding to a change of the specific mode, to the input information having a change of the specific mode,
wherein the change of the specific mode is a change having being included in the moving image through a pre-set specific movement of an image-capturing device itself having being executed at time of an image-capturing of the moving image with the image-capturing device, the change of the specific mode is a change becoming distinguishably independent of the input information just before and just after of the change of the specific mode in the moving image, and wherein the pre-set specific movement is given to the image-capturing device by an operator who handles the image-capturing device and the pre-set specific movement indicates at least an evaluation to the input information by said operator.

2. An information processing apparatus according to claim 1, further comprising a processing device which, based on the attribute information as linked, carries out a process corresponding to the specific attribute indicated by the attribute information, for the input information to which the attribute information is linked.

3. An information processing apparatus according to claim 2, wherein the processing device is a processing device which carries out one of outputting process of the input information, erasing process of the input information, or adding process of specific effect to the input information.

4. An information processing apparatus according to claim 1, wherein a change of the specific mode is at least one of a time change of the input information, an image change included in the input information, or a sound change included in the input information.

5. An information processing apparatus according to claim 1, further comprising a changing device which changes the content of the attribute information.

6. An information processing apparatus according to claim 1, wherein the attribute information is at least one of timing information indicative of timing at which a change of the specific mode generates in the input information, importance information indicative of degree of importance of the input information corresponding to a change of the specific mode, or time range information indicative of time range of the input information to which the attribute information is linked.

7. An information processing method, comprising:

a storing process of storing in advance attribute information indicative of specific attribute set in advance as attribute to be provided by input information, the input information being inputted from the outside and including a change of specific mode set in advance and a moving image, a detecting process of detecting a change of the input information inputted, and a linking process of, based on the change as detected and the attribute information as stored, in a case where the change as detected is a change of the specific mode, linking the attribute information indicative of the specific attribute corresponding to a change of the specific mode, to the input information having a change of the specific mode, wherein the change of the specific mode is a change having being included in the moving image through a pre-set specific movement of an image-capturing device itself having being executed at time of an image-capturing of the moving image with the image-capturing device, the change of the specific mode is a change becoming distinguishably independent of the input information just before and just after of the change of the specific mode in the moving image, and wherein the pre-set specific movement is given to the image-capturing device by an operator who handles the image-capturing device and the pre-set specific movement indicates at least an evaluation to the input information by said operator.

8. A non-transitory computer-readable storage medium where an information processing program is computer-readably recorded, the information processing program causing a computer to function as an information processing apparatus according to any one of claims 1 to 4, 5 and 6.

* * * * *